United States Patent [19]

McAllister

[11] Patent Number: 4,952,153
[45] Date of Patent: Aug. 28, 1990

[54] SURFACE MOUNTED MAGNETIC TOY

[76] Inventor: Norma J. McAllister, 82302 N. Bear Creek Rd., Creswell, Oreg. 97426

[21] Appl. No.: 345,693

[22] Filed: May 1, 1989

[51] Int. Cl.⁵ .................................................. G09B 1/06
[52] U.S. Cl. ..................................... 434/259; 446/137; 434/168
[58] Field of Search .................. 446/137, 139, 129; 434/259, 168, 81; 40/600, 621; 273/239

[56] References Cited

U.S. PATENT DOCUMENTS

| | | | |
|---|---|---|---|
| 3,093,919 | 6/1963 | Holtz | 446/137 X |
| 3,826,026 | 7/1974 | Bevan | 40/600 X |
| 4,487,585 | 12/1984 | Goldwasser | 434/259 |
| 4,609,356 | 9/1986 | Gilden et al. | 434/259 |
| 4,817,320 | 4/1989 | Fraynd | 40/621 |

Primary Examiner—Mickey Yu
Attorney, Agent, or Firm—James D. Givnan, Jr.

[57] ABSTRACT

A toy including a three-dimensional base having a magnetic sheet on its rearward side for temporary attachment to a metallic surface. The frontal surface of the base defines plural recesses each for the reception of a correspondingly shaped magnetic piece. The pieces each have a magnetic component for retention on a metallic surface when removed from base recess. When in place in a base recess, the magnetic components of the base and piece retain the latter in place. The pieces and their recess walls may be color coded to teach color recognition. A recess wall surface is provided with an image which differs from the image on other recess wall surfaces.

7 Claims, 1 Drawing Sheet

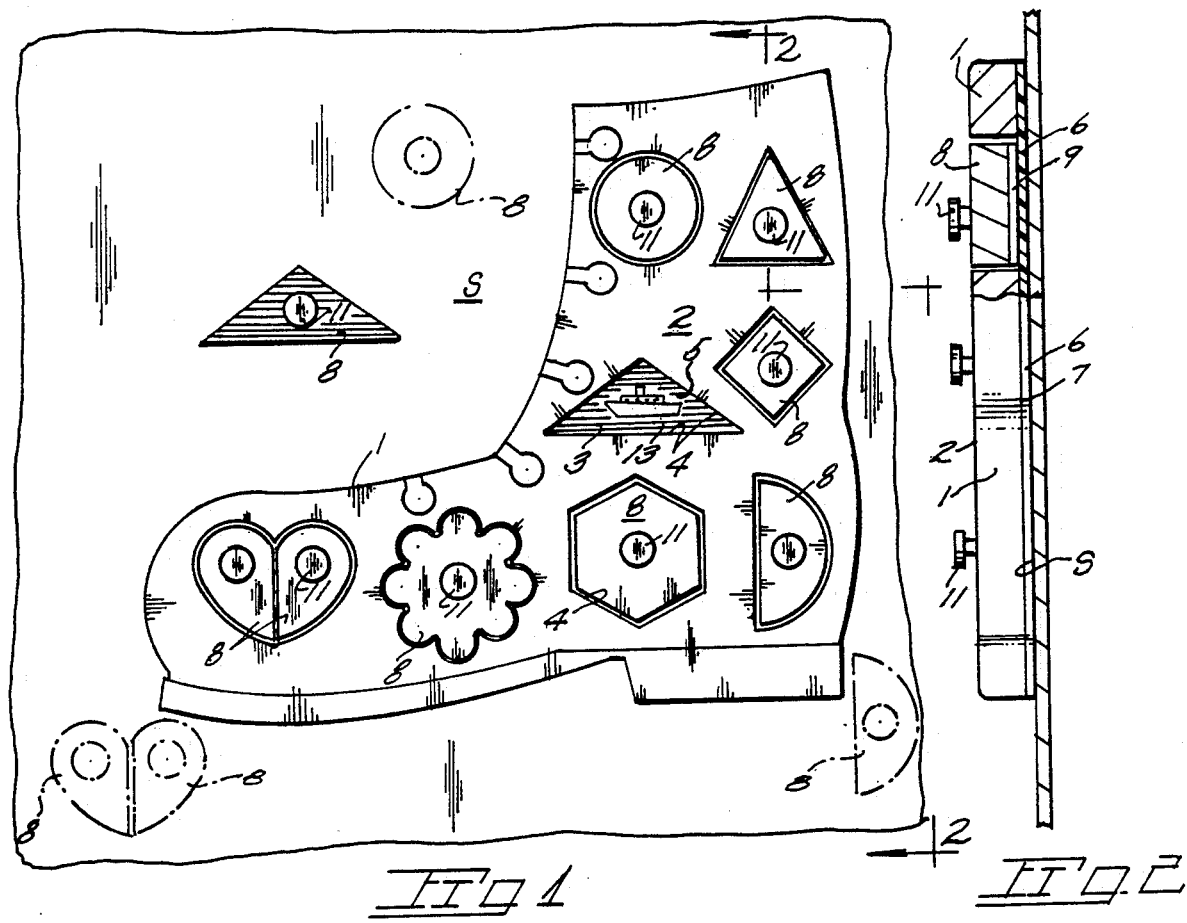
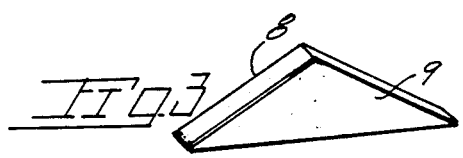
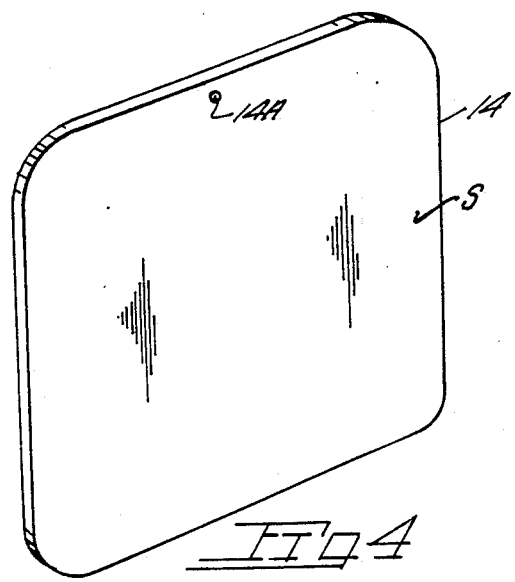

SURFACE MOUNTED MAGNETIC TOY

BACKGROUND AND SUMMARY OF THE PRESENT INVENTION

The present invention pertains generally to magnetic toys and games for preschool children.

Toys, games, etc., for young children often include a multitude of parts which render the toy usable only in certain rooms of the home. For example, it is impractical as well as unsafe to permit a young child to play with such toys or games in a kitchen. The present toy permits metallic surfaces present in a kitchen, as for example, refrigerator and automatic dishwasher doors to be used as playing surfaces. Both stationary and movable components of the present toy may be placed on such a metal door surface. A modified version of the present toy is supported in place on a metal tray permitting the toy to be used in any part of the home or in an auto. The movable pieces of the toy are of a configuration for magnetic retention in correspondingly shaped recesses in a base component of the toy. Various educational aspects may be sought by the provision of color, image or number matched pieces with a recess surface with matching images on a piece and recess surface developing the child's perception. Manual dexterity is also developed by requiring the child to insert pieces within closely corresponding recessed areas in the base of the toy.

Important objectives of the present toy include the provision of a toy for use on upright metallic surfaces such as the door surfaces of kitchen appliances to avoid floor clutter; the provision of a toy with magnetic base and magnetic pieces permitting same to be temporarily placed on a kitchen appliance wall surface; the provision of a magnetic toy with a multitude of magnetic pieces and including a metallic plate on which a toy base and pieces may be magnetically retained in place to prevent loss. These and additional objectives will become obvious upon an understanding of the following description.

BRIEF DESCRIPTION OF THE DRAWINGS

In the accompanying drawings:

FIG. 1 is an elevational view of the present toy;

FIG. 2 is an end elevational view taken from the right side of FIG. 1;

FIG. 3 is a perspective view of a piece removed from the remainder of the toy; and FIG. 4 is a perspective view of a metallic plate.

DETAILED DESCRIPTION OF THE PREFERRED EMBODIMENTS

With continuing attention to the drawings wherein applied reference numerals indicate parts similarly hereinafter identified, the reference numeral 1 indicates a base of the present toy.

The base is three-dimensional and may be of fanciful configuration attractive to a preschool child. A frontal surface 2 of the base defines opening for recesses 3. Internal walls 4 define the recesses 3 while a back wall is at 5. Back wall 5 constitutes the bottom of each recess 3. Preferably back wall 5 is a backing sheet 6 of synthetic material containing magnetized particles to permit magentic retention of the base on an upright metal surface S such as that of a kitchen refrigerator or dishwasher. A suitable adhesive joins the sheet 6 to the planar back surface 7 of base 1. Such magnetic material is sold by the 3M Company under the Registered Trademark PLASTIFORM.

Pieces at 8 of the toy are each of a shape to fit within one of the recesses 3 and hence require that the child make a comparison between the piece and the recesses to determine the proper recess for piece insertion. The pieces include a magnetic strip 9 in place on the piece rear side which magnetically adheres to base back wall surface 5 provided by sheet 6. Additionally the magnetic strip 9 of each piece permits temporary placement of each piece 8 on a metallic surface S adjacent base 1. The metallic surface may be that of a refrigerator door or the door of an automatic dishwasher for example. Each piece 8 includes finger grip 11.

The pieces are differently colored with the back wall surface 5 of the recess of the piece provided with a matching color. FIG. 1 shows such coloring in a typical manner for a triangular piece 8 and its triangular recess wall surface 5 both marked for the color blue. A different visual display on each back wall surface 5, such as the boat shown, permits the toy to be used in the testing of a child's memory.

For use of the toy in an automobile or in a room of the home not having a sizable metallic surface, a plate 14 is provided which serves in place of a metallic appliance door. Such a plate may take any shape that avoids angular corners that could constitute a risk of injury to the child. For installation on a wall inserted support, an aperture 14A is provided.

If so desired, the pieces 8 may be of a segmented nature whereby two or more piece segments would occupy a recess 3 and would require added effort of the child to assemble piece segments to permit installation in a single recess.

While I have shown but a few embodiments of the invention, it will be apparent to those skilled in the art that the invention may be embodied still otherwise without departing from the spirit and scope of the invention.

Having thus described the invention, what is desired to be secured by a Letters Patent is:

I claim:

1. A toy for use on a metallic surface and comprising,
    a three-dimensional base having a frontal surface, itnerior walls defining plural recesses, a magnetic backing sheet partially defining said recesses and enabling base attachment to said metallic surface,
    pieces one can for placement within one of said recesses, said pieces having magnetic properties for alternative retention in said recesses by said magnetic backing sheet or on the metallic surface, and
    said pieces and said recesses having corresponding shapes requiring selection of one of said pieces for placement in one of said recesses.
2. The toy claimed in claim 1 wherein said base is of fanciful configuration.
3. The toy claimed in claim 1 wherein said pieces each include a magnetic strip.
4. The toy claimed in claim 3 wherein said pieces each include indices for matching with like indices carried by said base.
5. The toy claimed in claim 3 additionally including a metal plate on which both said base and said pieces when removed from the base may be placed.
6. The toy claimed in claim 1 wherein one of said pieces is of segmented construction requiring assembly in a pre-determined manner to enable said one of said pieces to fit within one of said recesses.
7. The toy claimed in claim 1 wherein one of said interior walls of each of said recesses and the piece fitting in said recess have matching colors.

* * * * *